H. C. ROBERTS.
AUTOMOBILE JACK AND REVERSING STAND.
APPLICATION FILED SEPT. 17, 1912.
1,073,168.
Patented Sept. 16, 1913.
2 SHEETS—SHEET 1.
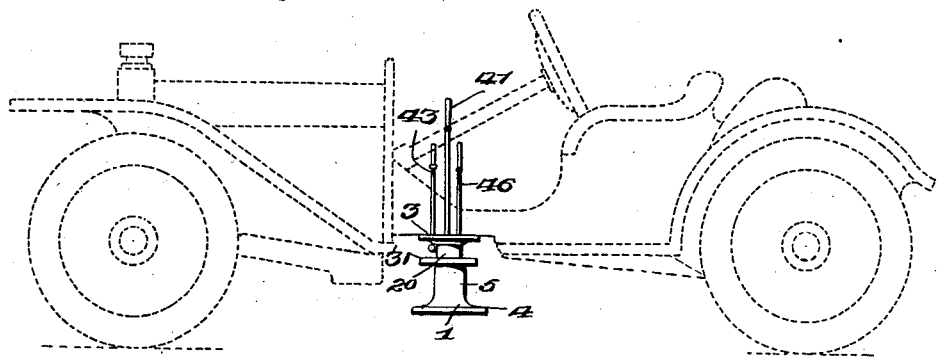
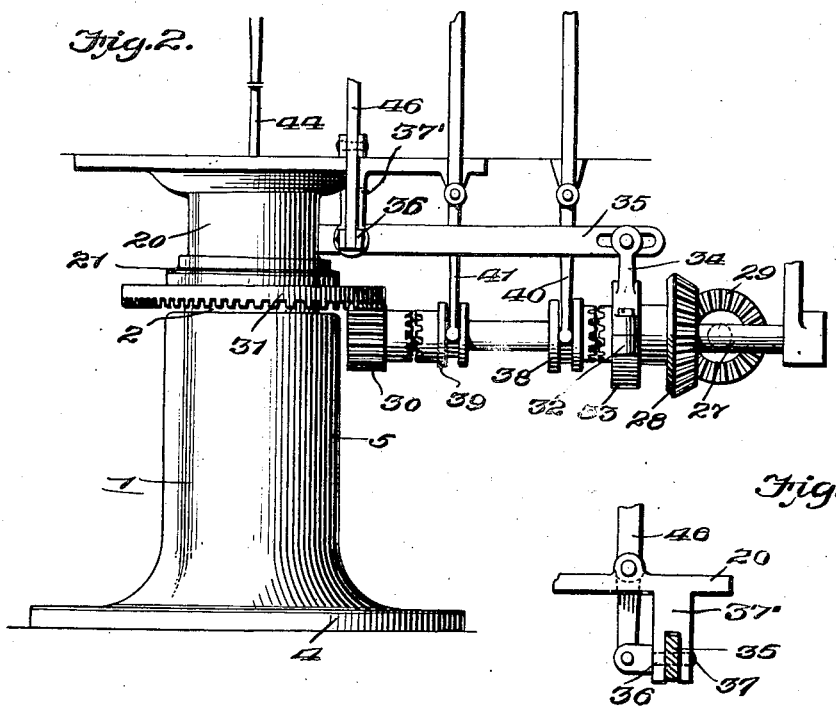
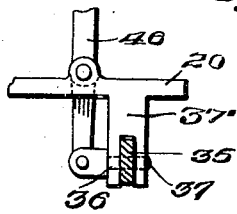
Witnesses
Inventor
H. C. Roberts,
By Watson E. Coleman,
Attorney H. C. ROBERTS.
AUTOMOBILE JACK AND REVERSING STAND.
APPLICATION FILED SEPT. 17, 1912.

1,073,168.

Patented Sept. 16, 1913.

2 SHEETS—SHEET 2.

Witnesses
Chas. L. Grieshauer.
A. I. Hind.

Inventor
H. C. Roberts,
By Watson E. Coleman,
Attorney

UNITED STATES PATENT OFFICE.

HENRY C. ROBERTS, OF MURPHYSBORO, ILLINOIS.

AUTOMOBILE JACK AND REVERSING-STAND.

1,073,168.  Specification of Letters Patent.  Patented Sept. 16, 1913.

Application filed September 17, 1912. Serial No. 720,853.

*To all whom it may concern:*

Be it known that I, HENRY C. ROBERTS, a citizen of the United States, residing at Murphysboro, in the county of Jackson and State of Illinois, have invented certain new and useful Improvements in Automobile Jacks and Reversing-Stands, of which the following is a specification, reference being had to the accompanying drawings.

The present invention comprehends new and useful improvements in fluid actuated jacks and relates more particularly to a device of this character which is adapted to be permanently connected to the frame of an automobile for lifting the same.

The invention has for its primary object to provide a combined jack and reversing stand of this character whereby the automobile may be readily raised from the ground and turned in a reverse direction, so that when it is impossible to turn the machine in the usual way within a garage or narrow road the vehicle may be readily reversed upon the stand.

The invention also aims to provide a device whereby the machine may be lifted from ruts, mud holes or the like found within the roads and also elevate the machine so that the tires or any parts thereof may be easily and readily fixed.

Other objects will appear hereinafter as the description continues.

With the above and other objects in view the invention consists of the novel details of construction, combination, formation and arrangement of parts as will be hereinafter more fully described, claimed and particularly pointed out in the appended claims.

In the accompanying drawings has been illustrated a specific embodiment and the preferred form of the present invention it being understood, however, that no limitation is necessarily made to the precise structural details therein exhibited but that the right is reserved to any changes and alterations that come within the scope of the present invention without departing from the spirit thereof.

Figure 3:
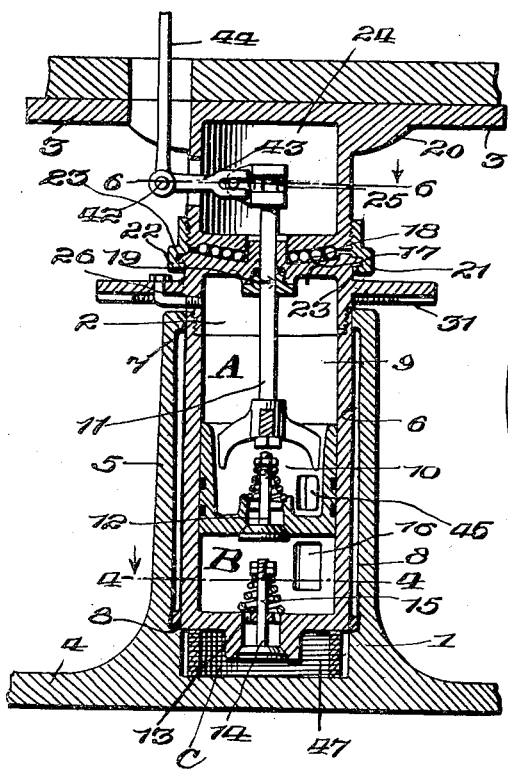
Figure 4:
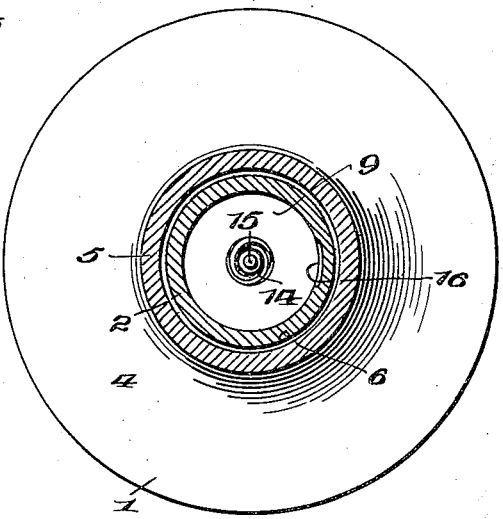
Figure 6:
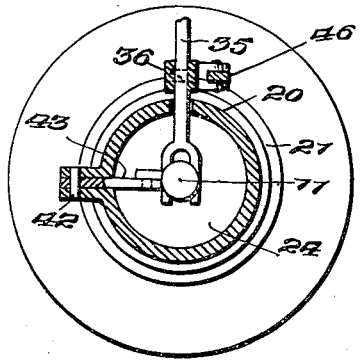
Figure 5:
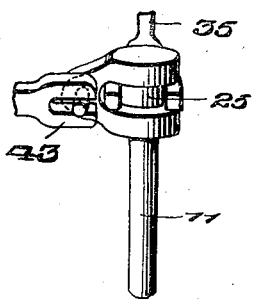

In the said drawings, Figure 1 is a side elevation of an automobile illustrating my invention as applied thereto; Fig. 2 is an enlarged end elevation of my invention as applied to the automobile frame; Fig. 3 is a vertical section through the stand illustrating the same in its normal position; Fig. 4 is a horizontal section taken on the line 4—4 of Fig. 3. Fig. 5 is a detail perspective view; Fig. 6 is a horizontal section taken on the line 6—6 of Fig. 3, and Fig. 7 is an enlarged detail section.

Reference now being had to the accompanying drawings wherein like and corresponding parts are designated by similar reference characters throughout the several views, the improved jack comprises two sections 1 and 2 being telescopically connected, and the section 2 thereof comprises a hollow pivot bearing and is permanently connected to the medial portion of the frame work of the vehicle by means of brace bars 3.

The base section 1 of the jack comprises an enlarged circular portion 4 which is adapted to rest upon the ground and has extending therefrom and made integral therewith, a sleeve or cylinder 5 having a centrally located bore 6 formed therein. The upper extremity of the sleeve 5 has an internally extending flange 7 formed therewith and the lower extremity of the section 2 has an annular flange 8 which is adapted to operate within the bore 6. These flanges obviously provide an air tight connection between two sections which will also limit their relative vertical movement.

The section 2 of the jack comprises a combined thrust bearing, plunger and piston cylinder, and is provided with a centrally located bore 9 in which is mounted for reciprocation a piston 10. This piston has extending therefrom the usual piston rod 11, while within the medial portion of the piston is a check valve 12. An opening 13 is formed within the lower extremity of the section 2, being in communication with the bore 9, and has mounted therein a check valve 14 from which extends a valve stem 15. A recess 16 is formed within the wall of the bore 9 adjacent the lower extremity thereof, the purpose of which will be hereinafter more fully described. The upper end of the section 2 is provided with a removable head 17 having a concave upper face in which bearing balls 18 are mounted, and this head has formed therein a bearing 19 through which extends the piston rod 11. The section 1 has a lower convexed face 20 which is adapted to rest upon the bearing balls 18, and this section or bearing member 1 is permanently connected to the frame of the vehicle by the bars 3. The outer periphery of the pivot member 1 is screw-threaded externally and has adjustably mounted thereon a flanged ring 21 having its flange 22 adapted to slide against the lower face of the annular projection or flange 23 of the member 17, for removably securing the members 1 and 2 together. The upper end of the piston rod 11 projects into the recess of the member 1 and has formed thereon a peripherally grooved head 25. A normally closed duct 26 is carried by the section 2 of the jack whereby oil or its equivalent may be injected into the bore 9 of the section 2 for a purpose which will be hereinafter fully described.

A shaft 27 is journaled within suitable bearings 27' and has keyed near one end thereof a bevel gear 28 which is adapted to mesh with the bevel gear 29 carried by the main driving shaft of the vehicle. Loosely mounted upon the opposite extremity of the shaft 27 is a gear 30 being in mesh with a crown gear 31 carried by the section 2 of the jack. An eccentric 32 is also loosely mounted upon the shaft 27 and carries an eccentric strap 33 having pivotally connected thereto a link 34. A lever 35 is provided with a slot 35' through which it is pivotally connected to one end of the said link 34 and the opposite end of said lever is forked and adapted to engage with the peripherally grooved head 25 of the piston 11. A bracket 36 depends from the block 20 and has formed within the lower extremity thereof a recess through which extends a lever 35. The bifurcated ends of the bracket 36 have alining apertures formed therein and the lever 35 has also an aperture formed therein which is adapted to register with the first mentioned apertures, and a pin 37 is adapted to extend through these apertures to provide a pivot or removable fulcrum point for the said lever 35. A pair of clutch members 38 and 39 respectively, mounted on the shaft 27 in such relation as to rotate therewith and to move axially thereof, and the said clutch members are adapted to engage with other clutch members formed on the sleeve of the eccentric 32 and the gear 30, respectively. These clutch members 38 and 39 have connected thereto levers 40 and 41, respectively, which are adjacent to the operator's seat so that the said clutch members may be manually thrown into and out of engagement with the eccentric and gear, respectively.

Pivotally mounted on the member 1 at 42 is an L-shaped lever 43 having one end thereof forked and engaged with a stud 43', while the upwardly extending arm 44 constitutes a handle, the purpose of which will be hereinafter explained.

A lever 46 is pivotally mounted upon the bar 3 and the lower extremity of this lever is pivotally connected to the pin 37 so that upon operating the said lever, the lever 35 will be disconnected from the bracket 36, at will, thereby eliminating the fulcrum point of the lever arm so that the lever 44 may be operated to bring the piston to its lowermost position, and to operate the piston manually and independently of the motive power of the vehicle.

The operation of the device will be as follows: As before stated the shaft 27 is operatively connected to the drive shaft of the vehicle's motor whereby a constant rotation will be imparted to the shaft 27. Assuming that the sections of the jack are in a closed position or in a position as shown in Fig. 3 of the drawing, the oil will then be within the chamber A of the bore 9 within the section 2. The clutch member 38 is then thrown into engagement with the clutch member carried by the eccentric 32 which will cause the eccentric to revolve with the shaft 27 thereby imparting a reciprocatory movement to the lever 35 which will also reciprocate the piston 10. During the reciprocation of this piston 10 the same will travel but a short distance within the bore 9 but above the recess 16 formed within one wall of the bore 9, and upon the upward stroke of this piston the oil contained within the chamber A will be allowed to pass through the check valve 12 into the lower chamber B. Upon the down stroke of the piston 10 the check valve 12 will be closed and the oil contained within the chamber B will then be forced through the check valve 14 into the chamber C formed within the section 1 of the jack and upon the continual reciprocation of the piston all of the oil contained within the cylinder A will be finally forced within chamber C thereby raising the section 1 relative to the section 2, which will obviously raise the vehicle from the ground. In lowering the vehicle, the lever 46 is operated which will disconnect the pin 37 from the lever 35. The lever 44 is then operated to cause the piston to assume its lowermost position and when the piston is at its lowermost position the opening 45 formed within the piston will register with the recess 16, thereby providing communication between the chambers A and B. When this piston 10 has been forced down to its lowermost position by the rod 44, the same will press the valve stem 15 thereby opening the valve 14 and the weight of the machine will then force the oil contained within the chamber C through the opening 13, thence through the recesses 16 and 45 back into the chamber A. A contractional coil spring 47 is mounted within the chamber C and has one end secured to the member 2, while its other end is secured to the base 4, for causing the section 1 to be lifted from the ground when the vehicle is at rest.

What I claim is:

1. In combination, an automobile, a hollow pivot member secured thereunder to the frame thereof at a point concentric with the center of gravity of the automobile, a lifter member comprising a combined thrust bearing and valved plunger and piston cylinder, said lifter member supporting said hollow pivot member concentrically therewith, a base adapted to rest upon the ground and having a cylinder extending upward therefrom, the plunger of the lifter member being operatively mounted in the cylinder of said base, means connecting said plunger with said base for normally holding the latter out of contact with the ground, a pump piston operatively mounted in the first said cylinder, a piston rod secured to said piston and extending upward therefrom into said hollow pivot member, means extending into said hollow pivot member and being operatively connected with the automobile motive power for operating said piston and thereby lifting the automobile by its own motive power, and means whereby the piston may be manually operated independently of said motive power.

2. In combination, an automobile, a hollow pivot member secured thereunder to the frame thereof at a point concentric with the center of gravity of the automobile, a lifter member comprising a combined thrust bearing and valved plunger and piston cylinder, said lifter member supporting said hollow pivot member concentrically therewith, a base adapted to rest upon the ground and having a cylinder extending upward therefrom, the plunger of the lifter member being operatively mounted in the cylinder of said base, means connecting said plunger with said base for normally holding the latter out of contact with the ground, a valved pump piston operatively mounted in the first said cylinder, a piston rod secured to said piston and extending upward therefrom into said hollow pivot member, and means extending into said hollow pivot member and being operatively connected with the automobile motive power for operating said piston and thereby raising the plunger and lifting the automobile by its own motive power.

3. In combination, an automobile, a hollow pivot member secured thereunder to the frame thereof at a point concentric with the center of gravity of the automobile, a lifter member comprising a combined thrust bearing and valved plunger and piston cylinder, said lifter member supporting said hollow pivot member concentrically therewith, a base adapted to rest upon the ground and having a cylinder extending upward therefrom, the plunger of the lifter member being operatively mounted in the cylinder of said base, means connecting said plunger with said base for normally holding the latter out of contact with the ground, a valved pump piston operatively mounted in the first said cylinder, a piston rod secured to said piston and extending upward therefrom into said hollow pivot member, and means whereby the piston may be manually operated.

4. In combination, an automobile, a pivot member secured thereunder to the frame thereof at a point concentric with the center of gravity of the automobile, a lifter member comprising a combined thrust bearing and valved plunger and piston cylinder, said lifter member supporting said pivot member concentrically therewith, a base adapted to rest upon the ground and having a cylinder extending upward therefrom, the plunger of the lifter member being operatively mounted in the cylinder of said base, means connecting said plunger with said base for normally holding the latter out of contact with the ground, a valved pump piston operatively mounted in the first said cylinder, and means for actuating the hollow piston and thereby raising said plunger and lifting the automobile into such relation that it may be easily turned to a horizontal plane on said pivot member.

In testimony whereof I hereunto affix my signature in the presence of two witnesses.

HENRY C. ROBERTS.

Witnesses:
JOHN J. PERKINS,
R. A. McCORD.